Dec. 15, 1964 P. BUISSON 3,161,827
ELECTRICAL APPARATUS FOR SUCCESSIVE MEASUREMENT
AND SIMULTANEOUS INDICATION ON AN OSCILLOSCOPE
OF A PLURALITY OF INPUTS TOGETHER
WITH A FIXED REFERENCE
Filed July 10, 1959 3 Sheets-Sheet 3

INVENTOR
PIERRE BUISSON

BY
ATTORNEY

United States Patent Office 3,161,827
Patented Dec. 15, 1964

3,161,827
ELECTRICAL APPARATUS FOR SUCCESSIVE MEASUREMENT AND SIMULTANEOUS INDICATION ON AN OSCILLOSCOPE OF A PLURALITY OF INPUTS TOGETHER WITH A FIXED REFERENCE
Pierre Buisson, 16 Ave. Victor Hugo, Vanves, Seine, France
Filed July 10, 1959, Ser. No. 826,159
12 Claims. (Cl. 324—121)

The present invention has for its object the simultaneous control of a plurality of quantities by an electric device which enables the said quantities to be successively measured, the said device being associated directly with, or at a distance from, a device which gives a simultaneous indication of these quantities.

In the most general aspect of the invention, the quantities measured are not necessarily of the same nature; in order for the method of the present invention to be applicable, it is only necessary that all the quantities measured may be converted to electrical quantities.

In French Patent No. 1,088,932 by the present applicant, it has been proposed to produce a multiple control device by placing the required number of galvanometers of the "profile" type closely alongside each other, these galvanometers being capable of operating each independently of the other, the combination of the readings in order to obtain a single minimum signal and a single maximum signal when any one of the readings reaches one or the other of these limits, being obtained by an additional photo-electric device.

While a device of this kind has proved satisfactory in use, it must be admitted that it proves bulky when the number of simultaneous controls is increased, and that its cost is relatively high by reason of the number of complete cells and the necessity for accurate mechanical assembly to ensure the correct alignment required by the photo-electric device.

In addition, problems have arisen of transmitting this information from an aircraft to the ground, with simple apparatus since radio-electric transmission does not ensure any constant relation between the intensity of the received signal and the transmitted signal.

In accordance with the invention, signals indicating the different variable parameters are transmitted in succession, together with one or two basic or datum reference signals, in such manner as to form, on the screen of an oscilloscope, an image representing a closed curve of which all the horizontal portions are significant, that is to say each represents a quantity or magnitude to be indicated and/or to be measured, or a reference quantity.

This closed curve may represent a single trajectory or a number of trajectories of the spot, persistence of vision causing the images to be superimposed.

The quantities measured may be of any particular kind, with the sole condition that their variations can be converted to variations of electric potential. The main object of the present invention being dimensional measurement, the description will be devoted to the application of this particular equipment. Different physical quantities such as forces, masses, accelerations, temperatures, which can readily be converted to dimensional variations, can also be measured and re-transmitted without difficulty by the use of additional devices which will not be described since they do not form any part of the present application, whilst for the transmission of voltage variations, the devices described below will only be used in part.

The measuring gauge which registers a dimensional difference and converts this to a modification of a ratio of capacities has already been previously described by the present applicant in U.S. Patent No. 2,732,625. The ratio of capacities may be converted to a voltage value by means of electronic circuits which have also been previously described by the present applicant in U.S. Patent No. 2,611,964.

In accordance with the present invention, the instantaneous measurement of each variable quantity is affected by a separate unit, the various units being caused to operate successively. This necessitates a new arrangement which can additionally ensure an interlocking function between the units.

To this end, in each said individual unit, there is employed a circuit comprising one or two electronic tubes for measuring a ratio of capacities, which is directly proportional at every instant to the variable quantity to be measured, for the production of a direct-current voltage, this voltage being reduced to zero during the periods when the other quantities are being successively measured by means of the other measuring elements.

The said electronic tubes operate as a frequency changer, and are preferably combined in a single tube, the triode portion of which is arranged as an oscillator, using a standard circuit arrangement, the control grid of the oscillator being directly coupled to a grid of the modulator or mixer tube. The said ratio of capacities is given for each unit by a Wheatstone capacity bridge, the out-of-balance voltage of which is proportional at every instant to the quantity to be measured and or to be indicated. This out-of-balance voltage is applied to a grid of the mixer tube, and the output current variations of the mixer tube are in this case a linear function of the unbalance of the capacity bridge, and therefore of the displacements of the central moving electrode of a differential condenser which forms two of the elements of the said capacity bridge.

In accordance with a further feature of the invention, a number of measuring elements of the type described above are grouped together in such manner as to constitute a measuring unit adapted to measure a corresponding number of quantities translated into electrical voltages, the measurements being effected successively by means of a blocking device which closes all the channels of the individual elements except one; the channels are thus opened in succession, one at a time.

In accordance with a further particular feature of the invention, a reading device is provided which permits of the simultaneous reading on suitable scales, of all the quantities of which the measurement has been carried out successively.

Finally, in accordance with another very important feature of the invention, the output signals of the measuring device are adapted either to give a direct and simultaneous reading of the quantities measured, or to be transmitted over a radio-electric channel to a receiving station distant from the point of measurement, or alternatively two quantities are transmitted in addition, these quantities representing the "limit" references (maximum or minimum) which permits of accurate reading at a remote point, independently of any attenuation or alteration produced by the transmission, the measurement signals and the said reference signals being reduced or increased in the same proportion.

Other features and advantages of the present invention will become more clearly apparent from the description which follows below by way of example and without any implied limitation, of one form or embodiment of the invention, reference being made to the accompanying drawings, in which:

FIG. 1 shows the connection diagram of a measuring element forming one of the measuring channels in accordance with the invention;

FIG. 2 gives the characteristic curves of the electronic tubes employed, showing the straight portions of the said curves used by the voltage variations corresponding to the quantities to be measured.

Figure 1:
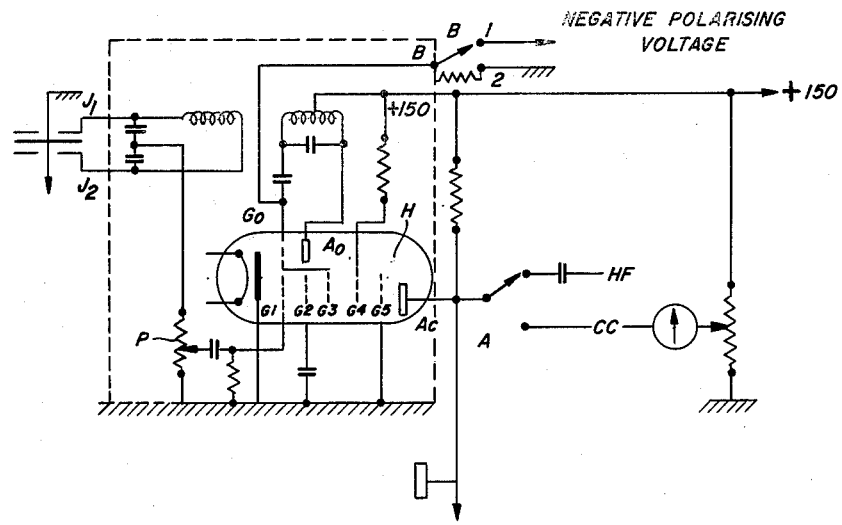

Referring now to FIG. 1, a frequency-changer tube H of the triode-heptode type is used in the connection shown by the diagram of the figure. The triode portion is connected as an oscillator using a standard circuit, with the plate of the triode back-coupled to the grid $G_0$ through an inductance $I_0$. The grid $G_0$ of the triode is directly connected to the grid $G_3$ of the heptode H, which is thus modulated by the oscillator frequency. The oscillator coil $I_0$ is magnetically coupled to a further coil $I_b$ which forms the supply transformer of the bridge $J_1$–$J_2$, constituted in the example shown by two fixed condensers and a differential condenser, the common electrode of which is actuated by the measuring feeler of a gauge. For a certain position of the movable common electrode of the differential condenser, the Wheatstone capacity bridge $J_1$–$J_2$ is balanced in respect of the oscillatory voltage supplied across one diagonal from the coil $I_b$, and any displacement of the said common electrode due to the actuating feeler results, as is well known, in the presence of oscillatory out-of-balance currents in the other diagonal of the bridge. The out-of-balance voltage of the bridge is applied to the grid $G_1$ of the heptode through a potentiometer P which acts as a potential divider with an adjustable output contact which enables the amplification to be reduced in such manner that the scale of reading of each measuring unit can be varied so as to adapt the scales to the tolerances permitted.

The operation is as follows:

At the output of the bridge $J_1$–$J_2$, there is obtained a variable oscillatory voltage in phase or in phase-opposition with that of the oscillator. The output of the oscillator is applied to the grid $G_3$ which plays the part of a phase discriminator, while the oscillatory output from the bridge is applied to the input grid $G_1$ of the heptode H.

The variations of the direct-current plate voltage of the heptode are directly proportional to the displacements of the moving electrode of the differential condenser of the bridge $J_1$–$J_2$; these variations are the result of double modulation of the plate voltage of the heptode H by the grids $G_1$ and $G_3$.

The oscillatory component of the plate voltage of the heptode H may also be utilized, since this component is also a linear function of the displacement of the moving electrode of the differential condenser of the bridge. Thus two methods of utilization of the signal are provided, corresponding to the two positions HF (oscillatory current) and CC (direct current) of the change-over switch A.

Figure 2:
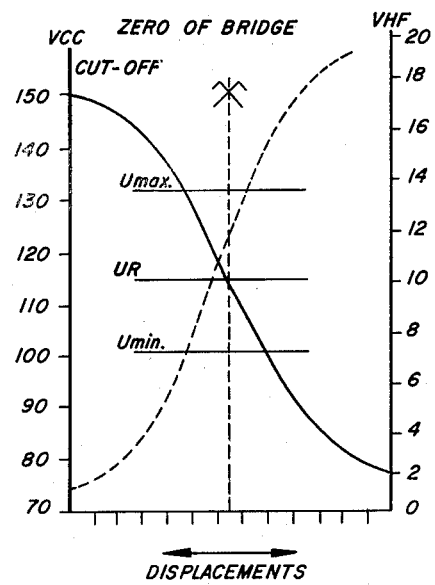

The response curve of the heptode (FIG. 2) is a straight line over a long central portion, and has bends at its two extremities due to the limits of use of the tube. Only the straight portion of this curve is normally used.

It will be observed that the voltages corresponding to the utilizable portion of the curve are located between two limits relatively distant from the point of cut-off. This particular feature is used as a means of control of the amplification when comparing the voltages U max. and U min. with a reference voltage $U_R$ which is generally chosen at the mean value.

The various functions may be carried out by means of separate tubes; a further stage of amplification can be obtained by replacing the potentiometer P by an amplifying circuit.

The particular advantage of this circuit arrangement is that it gives a signal which can be used at the zero of the bridge, and this signal depends solely on the supply voltage of the oscillator, and can be compared with a continuous voltage, also depending on the oscillator voltage and again by the zero method, the switch A being in the position CC of FIGURE 1.

In this way, there is obtained a self-stabilizing unit, which is of the utmost importance in an electronic measuring apparatus. This comparison by zero method can be carried out at a later stage, after amplification. For this purpose, the H.F. position of the change-over switch A, FIG. 1, is used, which again gives a direct current after amplification and detection.

The grids $G_0$ and $G_3$ are connected through a resistance at 2 to earth. When a sufficiently high negative potential is connected to one of these grids through switch terminal 1, the tube is blocked because the grid is biased to cut off. This feature permits the connecting of a number of bridge-heptode measuring channels or units in parallel, with the plates of the heptodes connected together. This is accomplished by impressing a blocking or cut-off potential onto all except one of the grids $G_0$, so that all of the units or channels are inoperative, except for that one. A sequence switching arrangement is provided for applying blocking voltages in that manner and rendering the various channels or units operative in succession one by one.

This switching operation can be effected mechanically by means of a rotary device, without much regard for contact resistances, since the cut-off voltage can be chosen at a sufficiently high value without disadvantage, any variation of voltage on the gauges which are then blocked having no effect on the reading of the single gauge which is operative.

Figure 3:
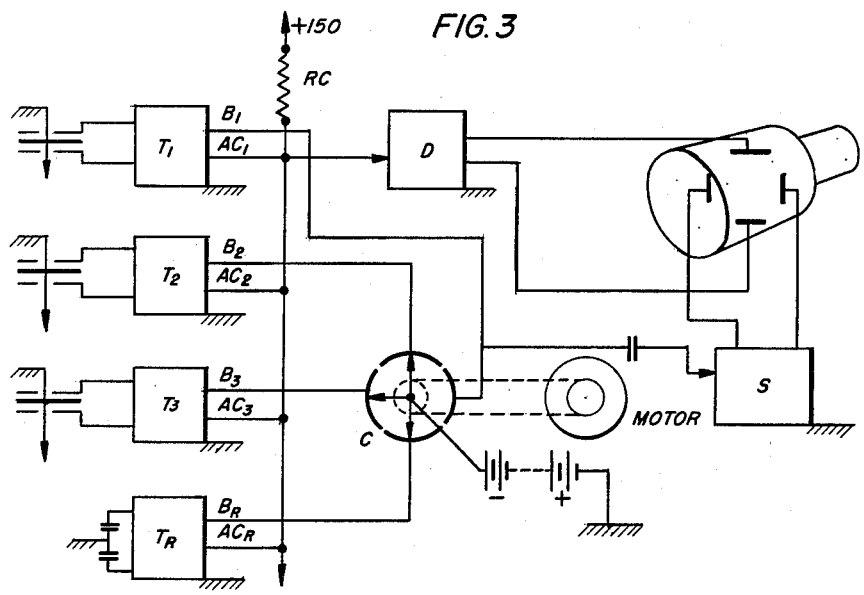
FIG. 3 shows a general diagram of a number of measuring elements of the kind shown in FIG. 1, associated with a device for blocking the measurement channels and with a cathode-ray tube for the simultaneous reading of the quantities measured.

This elementary arrangement is shown in FIG. 3. In this figure, each circuit corresponding to the unit of FIG. 1 is represented by a rectangle marked $T_1$, $T_2$, $T_3$ . . . $T_R$. The unit $T_R$ is identical with those preceding, except as concerns the measuring gauge, which is replaced by two condensers as shown.

The units $T_1$, $T_2$, $T_3$ . . . $T_R$ are coupled to each other so as to employ a common load resistance RC, connected to $AC_1$, $AC_2$, $AC_3$, etc.

The blocking circuits $B_1$, $B_2$ $B_3$ . . . are each coupled to a switching member C, the rotation of which is effected by a motor and which at each angular position applies to all the groups except one a negative potential amply sufficient to put all of them except one at cut-off. The voltage read at the terminals of RC thus depends solely on the single gauge in operation.

The amplifier D and the synchronised scanning control S are of standard type adapted to the cathode-ray tube.

The operation is as follows:

Since only one of the group is in a state of operation for any given position of the rotary switch, the difference of potential at the terminals of RC is dependent on the gauge which is coupled to this single group.

The alternating or continuous voltage at the terminals of RC is applied after amplification, between the vertical plates of the oscilloscope, the synchronised scanning converting this voltage to the form of a straight line from right to left.

In the case of alternating current connection (position HF of switch A, FIGURE 1), which permits the use of a common earth, a detection stage (not shown) associated with a voltage-limiting device (also not shown) at the input of the direct-current amplifier D, converts this alternating voltage to direct current, which restores the system to the general case.

During the rotation of the rotary switch, the different values to be measured are explored successively.

Figure 4:
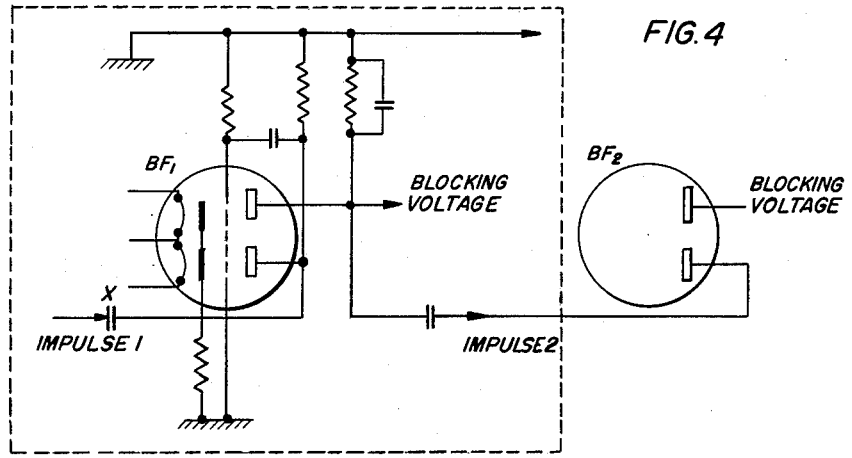
FIG. 4 shows an alternative arrangement of an electronic means of blocking the measurement channels.

Alternatively, an electronic switching arrangement may be employed, as shown in FIG. 4, replacing each contact element of the rotary switch C of FIG. 3, employing a circuit similar to that of a "flip-flop" circuit having two positions of stability. In this figure, the circuit comprised in the square in dotted lines comprises a pair of low-frequency tubes connected in a bi-stable trigger circuit. Each blocking potential indicated by $B_1$, $B_2$ ... $B_R$ in FIG. 3 is supplied by a flip-flop element, the said potential being obtained from the point indicated by the arrow Blocking Voltage in FIG. 4. There will thus be $n$ flip-flop elements for a system comprising $n$ channels.

The control impulse for the first relaxation element, applied in the direction of the arrow X, is supplied by the generator of horizontal saw-tooth oscillations, indicated diagrammatically by the unit S of FIG. 3. Each of the other bi-stable circuits is controlled by the end of the signal of the circuits which precedes it, as shown by the arrow "impulse 2" of the second relaxation element $BF_2$ of FIG. 4.

In the case of electronic switching the synchronisation is controlled by the scanning of the oscilloscope, whilst in the case of mechanical switching, the converse method is used (FIGURE 3).

In the case in which the quantity to be measured is a variable voltage, the unit T is replaced by a single electronic device, similar to that shown in FIG. 1, the triode oscillator being no longer used and the voltage to be measured being supplied to the grid $G_1$ of the heptode.

In accordance with the invention, use is made of one or two additional units regulated to the zero of the bridge, or, as may be required, one or two direct-current voltage references derived from the same supply as that of the gauge units.

Figure 5:
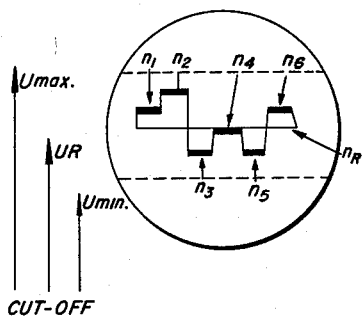
FIG. 5 illustrates the simultaneous indication of the quantities measured on the screen of the cathode-ray tube of FIG. 3, the return line of the spot serving as the central line of reference.

An additional unit or voltage may be interposed either in the outgoing or preferably in the return circuit of the spot, thus forming on the screen of the oscilloscope an image of a closed circuit, of which all the horizontal lines $n_1$, $n_2$, $n_3$ ... etc., are significant as shown in FIG. 5, each of the outgoing levels defining a measured quantity, while the return level $n_R$ defines a known quantity which serves as a datum reference, whatever may be the position of the image on the screen.

It should be observed, as has previously been indicated, that the voltage corresponding to cut-off is far removed from U max. and U min., and is situated outside the screen. The result is that the voltage $U_R$ which has been selected as corresponding to the zero of the bridge, and which will be situated on the central line corresponding to equality of the voltages on the deflecting plate, will be totally displaced during any variation of amplification, even small, whereas U min. and U max. are very close to the reference line and their relative distance from said reference line will thus vary only very slightly.

The voltage corresponding to cut-off may be chosen so far distant from the line of reference in the case of high amplification, that it becomes advisable to use a threshold diode in order to protect the tube.

The advantage of this arrangement resides in the certainty given to the operator of an invariable calibration, to the extent that the line corresponding to $U_R$ has remained in a clearly indicated position on the screen.

In addition, if minimum and maximum limits have been fixed for each of the measured quantities, it is only necessary to regulate the amplification in such manner that these limit values correspond to the same values U min. and U max. for each of the gauges. This function is carried out by the potentiometer P (see FIG. 1), in order that the closed curve representing different parameters, between limits, is wholly situated between two horizontal lines corresponding to U min. and U max., whereas any passage beyond these limits causes one or the other of these lines to be crossed.

In the case of a cathode-ray tube having white luminescence, colored screens $E_1$, $E_2$ placed on the tube enable any passage beyond these limits to be easily observed, as shown in FIG. 5.

Figure 6:
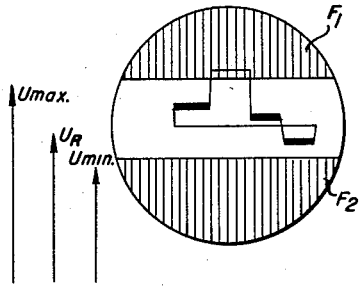
FIG. 6 shows the use of a screen with white luminescence having coloured screens placed on the cathode-ray tube in order to mark the minimum and maximum limits imposed on the measured quantities.

In the case of luminescence with a monochromatic tendency, screens are employed having striated bands $F_1$, $F_2$, as indicated in FIG. 6, which cause the upper and lower limit lines to be shown dotted as indicated in FIG. 5, the crossing of the minimum or maximum limits also corresponding to an increase in the difference of potential between the deflecting plates and the anode, which is generally connected to earth.

Figure 7:
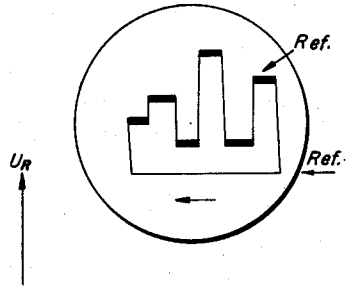
FIG. 7 shows a simultaneous indication of the quantities with the return line of the spot serving as the lower line of reference.

In the case of the curve shown in FIG. 7, the level $U_R$ of the line formed by the return of the spot and used as the single line of reference, is determined by the pre-setting of a cathode potentiometer incorporated in the amplifier D (see FIG. 3). In this alternative form, it is an essential condition that the sum of the time-constants of the bi-stable elements or of the channel-blocking diode by the device C of FIG. 3, should be less than the duration of the horizontal scanning period.

Figure 8:
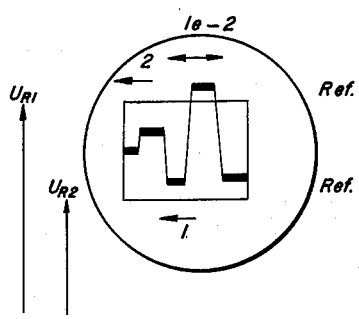
FIG. 8 illustrates a simultaneous indication in which the return paths of the spot are alternately displaced so as to provide both the upper and lower lines of reference.

The curve of FIG. 8 comprises, in addition to the curve of the measured quantities, two lines of reference situated on each side of the curve. The reference line $U_R$ is produced in the same way as the corresponding line $U_R$ of FIG. 7. The upper reference line $U_{R1}$ may be obtained by means of a reference gauge such as the gauge $T_R$ of FIG. 3, controlled by a switching device which renders it operative once in every two return passages of the spot.

The potentials applied to each of the plates may be compared with two reference potentials by means of a suitably orientated diode which gives an impulse for every crossing of the limits imposed.

Means are already well known which employ an impulse to control a signal, having a sufficient duration to actuate automatic or controlling equipment.

For example, in the application of the invention to the verification in service of the dimensions of mechanical or like parts, the device may serve to actuate a trap door which eliminates every defective part during its subsequent transfer, or to cause the stopping of the cycle of operation of a machine-tool when the last piece machined is not satisfactory.

There is a clear advantage in representing the whole of the controlled parameters, including the datum references, by a closed curve which results in a simplicity of the visual self-control devices and automatic control apparatus which it is possible to produce, whatever may be the number of parameters to be controlled.

When it is desired to transmit the reading to a distant point, for example a reading on the ground in the case of an aircraft in flight, a radio-electric link being employed for the transmission of the signal between the common load resistance of the multiple gauges and the reading oscilloscope, large variations of intensity must be anticipated in the received signal, and these variations would result in a constant displacement of a single line of reference.

In this case, two elements or two additional voltages are employed and are located either in the outgoing circuit or preferably in the return circuit of the spot, thus forming on the screen a closed-circuit image, of which all the horizontal lines are significant, each of the lines on the outgoing trajectory defining a measured quantity or a reference quantity, as the case may be, while the return circuit defines a second reference, independently of the general position of the screen.

The references may be both placed on the return circuit of the spot if there is provided a bi-stable flip-flop device giving alternately to each even or odd return trajectory the lower or upper value corresponding to the upper or lower reference values.

Furthermore, by multiplying these bi-stable units, it is possible to increase the number of reference lines in the same way as would be carried out by a designer reproducing the curve on paper.

To sum up, a reference gives the situation of the curve, and for a fixed situation the scales may be considered as invariable. Two references give directly the value of the scale and the position. The multiplication of the references beyond two only gives additional facilities of reading.

When the number of reference lines is equal to or greater than two, the readings presented on the oscilloscope are always faithful, whatever variations of intensity may exist in the reception of the signal, since these are always relative to the reference lines which can be read simultaneously.

Amongst the very numerous applications of the invention, there may be cited the simultaneous control of the same dimensions of different pieces, the simultaneous control of a number of quantities or magnitudes, in particular of a number of dimensions of mass-produced parts, with an indication and/or a stopping or sorting action on the parts depending on their dimensions outside the limits, and the simultaneous reading of a large number of parameters on a screen of small dimensions.

This latter application has a particular advantage for the control panel of an aircraft, the system according to the invention permitting of a reading of a number of parameters at the same time and thus simplifying the supervisory work of the pilot.

The system also permits of the transmission, with great simplicity and fidelity, from an aircraft in flight to the ground, of indications giving at every instant the indications of the various instruments on the control panel. In the latter case, the radio-electric transmission may be effected by means of the aircraft transmitter, using radio-telephony for simultaneous duplex transmission.

By reason of the essentially simple nature of the signal thus transmitted, the signals may be readily recorded so as to give a continuous ratio of the indications of the various instruments or the like representing useful parameters of flight, of the engine, and of conditions of temperature, pressure, etc.

What I claim is:

1. An electrical system for the successive measurement and the simultaneous visual indication of a plurality of variable quantities together with at least one fixed reference quantity, in which one channel is provided for each said quantity, said system comprising: a device in each variable-quantity channel for converting the variations of said quantity to electrical values, said converting device including a Wheatstone bridge circuit the ratio of which is varied in dependence on the variations of the quantity considered; a Wheatstone bridge circuit in each reference-quantity channel, said bridge circuit having a fixed ratio; each of said channels including an oscillation generator, coupling means for applying high-frequency oscillations from said generator across one diagonal of said bridge circuit, an electronic tube, means for applying the oscillatory voltage from the other diagonal of said bridge to one grid of said tube, and direct coupling means for applying the oscillations from said generator to another grid of said tube; blocking means for simultaneously closing all said channels except one, and switching means for rendering said channels operative in succession, one at a time; an oscilloscope device having scanning plates and deflecting plates and a scanning-voltage generator coupled to said scanning plates; and means for selectively and successively coupling said deflecting plates to the outputs of said successively-operative channels, the return trace of the scanning beam being utilized to indicate a reference quantity, whereby there is formed on the screen of said oscilloscope an image representing a closed curve, of which all the horizontal lines are significant and which each represent a quantity to be measured or a reference quantity, irrespective of the magnification employed and of the position of said image on said screen.

2. An electrical system as claimed in claim 1 which includes means in each of said channels deriving said quantity-signal voltage as a direct-current voltage which is proportional at every instant to the variable quantity to be measured, said tube being adapted to carry out simultaneously the functions of an oscillator, a phase-discriminator and a modulator; and means for annulling the said voltage during the successive periods of measurement of the other quantities.

3. An electrical system as claimed in claim 1, in which said blocking means for said channels comprise a rotary switching member driven in rotation at a constant speed, said member comprising a rotating contact and as many fixed contacts as there are channels to be controlled, said switching member acting in such manner as to apply, in each angular position, to all said channels except one, a negative potential amply sufficient to place said channels at cut-off, whereby the output voltage depends solely on the single quantity signal voltage from the channel in the operative condition.

4. An electrical system as claimed in claim 3, and further comprising means associated with said channel blocking means for controlling the synchronisation of said scanning voltage generator.

5. An electrical system as claimed in claim 1, in which said means for blocking the channels comprise a plurality of bi-stable "flip-flop" units each said unit constituting an electronic switch, said bi-stable devices supplying the blocking potential of their respective channels, the number of said units being equal to the number of channels provided in said system.

6. An electrical system as claimed in claim 1, in which the bridge circuit of each variable-quantity channel is a capacity bridge including a differential condenser, the moving electrode of which is actuated in dependence on the quantity to be measured and indicated, and the bridge circuit of the reference-quantity channel is a fixed capacity bridge.

7. In a radio-frequency transmission system comprising a transmitter and a receiver distant from said transmitter, an electrical system as claimed in claim 1, the output signals from said variable-quantity and reference-quantity channels being transmitted from said transmitter, the said oscilloscope device being located in said receiver.

8. An electrical system as claimed in claim 1, which includes means to adjust the amplitude of the voltage derived from said reference-quantity channel so that the return trace of said scanning beam serves as a central line of reference.

9. An electrical system as claimed in claim 1, which includes means to adjust the amplitude of the voltage derived from said reference-quantity channel so that the return trace of said scanning beam serves as the upper line of reference.

10. An electrical system as claimed in claim 1, which includes means to adjust the amplitude of the voltage derived from said reference-quantity channel so that the return trace of said scanning beam serves as the lower line of reference.

11. An electrical system as claimed in claim 1, which includes means to alternately vary the amplitudes of the voltage derived from said reference-quantity channel so that the return traces of said scanning beam provide both the upper and lower lines of reference.

12. An electrical system as claimed in claim 5, and further comprising means for controlling the synchronization of said flip-flop devices by said scanning-voltage generator.

References Cited in the file of this patent
UNITED STATES PATENTS

| | | |
|---|---|---|
| 2,412,350 | Morgan | Dec. 10, 1946 |
| 2,480,636 | Dieke | Aug. 30, 1949 |
| 2,485,343 | Zuschlag | Oct. 18, 1949 |
| 2,525,675 | Heller | Oct. 10, 1950 |
| 2,549,780 | Earp | Apr. 24, 1951 |